United States Patent [19]

Flax et al.

[11] 4,323,739
[45] Apr. 6, 1982

[54] TELEPHONE LOCKING DEVICE

[75] Inventors: Louis Flax, Moonachie; Vincent Brzezinski, Wyckoff, both of N.J.

[73] Assignee: Televault, Inc., New York, N.Y.

[21] Appl. No.: 47,307

[22] Filed: Jun. 14, 1979

[51] Int. Cl.³ ............................................. H04M 1/66
[52] U.S. Cl. ............................. 179/189 D; 179/90 D
[58] Field of Search ............. 179/189 D, 90 D, 90 K, 179/90 R, 18 DA, 14

[56] References Cited

U.S. PATENT DOCUMENTS

| | | | |
|---|---|---|---|
| 3,866,000 | 2/1975 | Gillis | 179/189 D |
| 3,899,647 | 8/1975 | Nachsi et al. | 179/189 D |
| 3,965,310 | 6/1976 | Willy | 179/189 D |
| 4,005,279 | 1/1977 | Richter | 179/189 D |
| 4,081,630 | 3/1978 | Washburn et al. | 179/189 D |
| 4,131,769 | 12/1978 | Davis | 179/189 D |

*Primary Examiner*—Gerald L. Brigance
*Attorney, Agent, or Firm*—Shoemaker and Mattare, Ltd.

[57] ABSTRACT

A telephone locking device for preventing unauthorized use of a push-button type telephone includes a shield covering at least one of the dial push-buttons to prevent unauthorized access to that push-button. The shield is held on the telephone by either a push-button gripping device or a strap, and a key is required to release the shield.

17 Claims, 15 Drawing Figures

TELEPHONE LOCKING DEVICE

BACKGROUND OF THE INVENTION

The present invention relates in general to telephones, and, more particularly, to devices for preventing unauthorized use of a telephone.

Unauthorized use of telephones has, in recent years, become an extremely large source of loss to businesses as well as to telephone companies. This unauthorized use includes the placing of unauthorized long-distance telephone calls, illegal use of Watts lines or the like, or other such unauthorized uses. Often, an unauthorized user tampers with the dialing mechanism of a telephone to execute the unauthorized use. Such tampering may damage the telephone, thereby adding further costs to the costs engendered by the unauthorized use itself.

Prevention of unauthorized use of a telephone is complicated somewhat by the insistence of telephone manufacturers that nothing permanent be attached to a telephone. Thus, screws, bolts or other such mounting means cannot be used to affix a dial-locking device on a telephone.

There are telephone locking devices presently available, and the most well known of these devices is the lock cylinder used in conjunction with dial telephones. However, there are no similar devices known for use with push-button telephones.

One device for preventing unauthorized use of a push-button telephone includes a lock placed on the receiver-depressed button located in the receiver cradle. This lock keeps this button depressed even when the telephone receiver-transmitter is not accommodated in the receiver cradle. This locking device is only marginally effective because it is very easily defeated. One wishing to use a telephone equipped with such a lock merely removes the entire case section from the telephone by backing two screws in the telephone chassis out and lifting the case off that chassis. The case, along with the locking device, is thus removed and the telephone remains usable. After completion of the unauthorized use, the telephone case is simply replaced, and there is no sign of such unauthorized use.

The known devices suffer still a further drawback because such devices require the entire telephone to be disabled. If a user wishes only a single button disabled, these known devices are virtually useless. Such a situation arises when a business has an internal telephone system coupled to the usual external telephone system by depressing a particular button, such as the nine button, then dialing the external telephone number. If such a business wishes to prevent external calls on certain telephones, only the nine button need be disabled, and not the entire telephone.

There is thus a need for a telephone locking device which discourages, if not totally prevents, unauthorized use of a push-button telephone. The locking device should prove tampering or unauthorized use, and should be able to disable only a single button if so desired by a user.

SUMMARY OF THE INVENTION

The device embodying the teachings of the present invention effectively disables one or a plurality of push-buttons of a push-button telephone in a manner which prevents, or at least discourages, unauthorized use of the telephone. Even if the device of the present invention is somehow defeated or circumvented, the unauthorized use of the telephone is made evident by the device.

The telephone locking device embodying the teachings of the present invention includes a shield having a recess defined in one side thereof. The recess accommodates at least one button of the array of push-buttons found on a push-button telephone. The shield is attached to the telephone to prevent access to the accommodated push-button. Thus, once the shield is in place, use of a push-button accommodated in a recess is prevented, or at least discouraged. The shield can also cover the entire array of push-buttons if so desired, or several of those buttons.

One embodiment of the device includes a strap encircling the telephone body to harness the shield to the telephone. A lock prevents removal of the harness strap. Another embodiment of the device includes clamping means for clasping one or more of the push-buttons individually to thereby secure the shield onto the telephone. The clamping means is cam actuated with movement of the cam being controlled by a locking mechanism. Thus, a key unlocks the lock, and permits movement of the cam which causes corresponding movement in the clamping mechanism to free the clamped push-button, and thereby permit removal of the shield from the telephone.

The device of the present invention cannot be circumvented by removal of the case from the telephone, as even without the case, access to the push-buttons themselves is prevented by the shield.

The device of the present invention cannot be removed without scarring, or severely damaging, the telephone, and in particular, the push-buttons. Circumvention of the device is thus easily proved. Furthermore, the device cannot be reset without the use of a key, and thus, even if removed in an unauthorized manner, the device cannot be reset on the telephone, again proving unauthorized use.

The device is easily placed on any push-button telephone, and does not require any modification of the telephone. The requirement of the telephone manufacturers that no permanent devices be fixed to the telephone is thus satisfied by the device of the present invention.

The device of the present invention is extremely versatile because it can be used to disable a single button or a plurality of buttons on the telephone.

In short, the device of the present invention effectively prevents, or at least provides substantial discouragement of, unauthorized use of a push-button telephone without suffering the drawbacks discussed above in regard to the prior art devices.

OBJECTS OF THE INVENTION

It is, therefore, a main object of the present invention to prevent unauthorized use of a push-button telephone.

It is another object of the present invention to prove unauthorized use of a push-button telephone.

It is still another object of the present invention to prevent unauthorized use of a push-button telephone without requiring any permanent attachments to be affixed to a telephone case.

It is yet another object of the present invention to provide a versatile device which prevents unauthorized use of a push-button telephone.

It is a further object of the present invention to provide a device which prevents unauthorized use of a push-button telephone and is easily installed and removed by an authorized person.

These together with other objects and advantages which will become subsequently apparent reside in the details of construction and operation as more fully hereinafter described and claimed, reference being had to the accompanying drawings forming part hereof, wherein like reference numeral refer to like parts throughout.

DETAILED DESCRIPTION OF THE INVENTION

Figure 1:
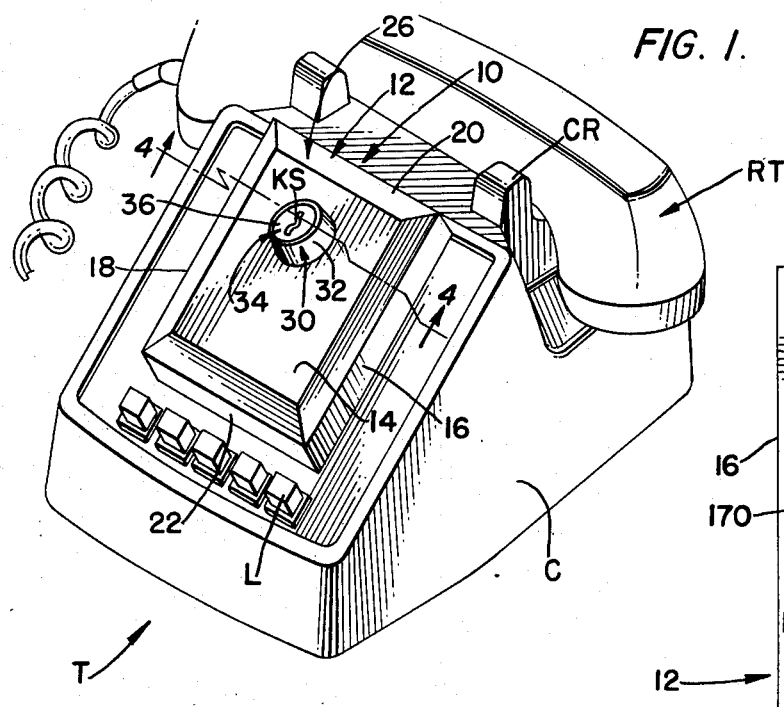
FIG. 1 is a perspective of a dial push-button telephone having thereon a locking device embodying the teachings of the present invention.

Shown in FIG. 1 is a dial push-button telephone T having a casing C mounted on a chassis CH and having a receiver cradle CR for accommodating a receiver-transmitter RT. The telephone T can be a single line telephone, or a multiple line telephone having line selector buttons L. The telephone T shown in FIG. 1 has a locking device 10 thereon for preventing, or at least severly discouraging, unauthorized use of the telephone T.

The locking device 10 is rectangular in peripheral shape, and includes a shield 12 having a front surface 14, sides 16 and 18, and ends 20 and 22. As shown in FIG. 1, the shield can have a chamfered surface 26 on the front surface thereof.

A shield mounting means 30 is attached for access thereto from the front of the shield. The mounting means 30 includes a tubular escutcheon 32 surrounding a locking means 34 which has a key barrel 38 telescopingly received in the escutcheon. An operating key slot KS is defined in the top surface of the key barrel to be presented outwardly of the shield as shown in FIG. 1. In the FIG. 1 embodiment, the top surface of the barrel 38 and the top surface rim of the escutcheon are coplanar with each other, and the mounting means 30 is located in the upper half of the shield as shown in FIG. 1 for a purpose to be discussed hereinafter.

Figure 5:
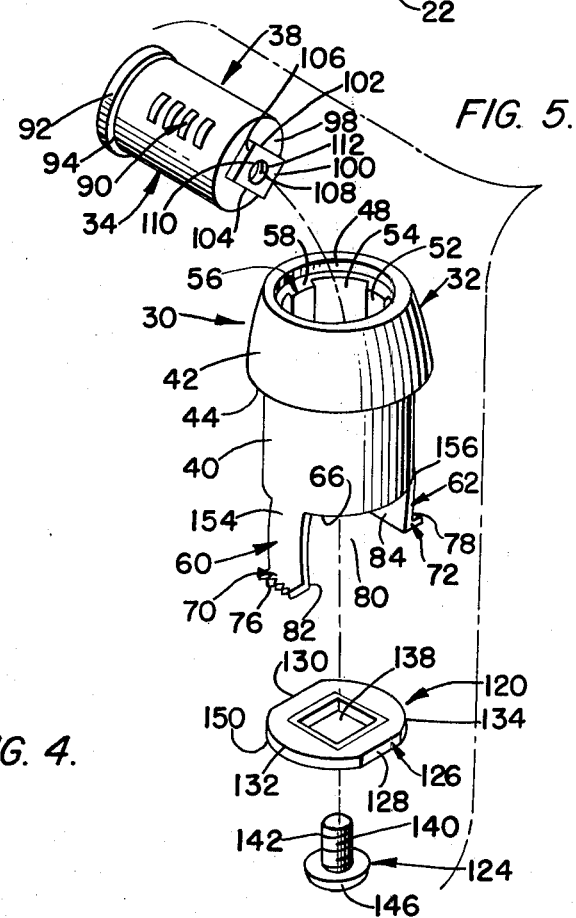
FIG. 5 is an exploded perspective of a locking and dial push-button grasping means used in the locking device embodying the teachings of the present invention.

The shield mounting and locking means are best shown in FIG. 5, and attention is directed thereto. As shown in FIG. 5, the escutcheon 32 includes a tubular body section 40 and a head section 42 which is in the shape of a truncated cone having a base 46 with an outer diameter larger than the outer diameter of the tubular body section to define a ledge 44 at the juncture of these two elements. A longitudinally directed bore 48 is defined in the escutcheon and keyway slot defining projections 52 are positioned on the inner surface of the bore 48 to extend essentially the entire longitudinal length of the escutcheon. Keyways 54 are defined by the projections. A top rim 56 is defined on the bore inner surface 48 near the top rim of the escutcheon to define a shoulder 58 in the escutcheon.

A pair of downwardly projecting prongs 60 and 62 are each integrally attached at one end thereof to bottom rim 66 of the tubular body section 40. The prongs are lengthwise arcuate to be bowed slightly outwardly away from each other and are essentially coextensive from the bottom rim 66. The prongs have telephone dial push-button gripping jaws 70 and 72 on the lower ends thereof. The gripping jaws 70 and 72 are disposed at essentially right angles to the prongs and are essentially coplanar with each other. The gripping jaws are each disposed to have a rear end integrally connected with a lower end of a prong and a free end thereof presented outwardly of the escutcheon. Gripping teeth 76 are defined on the outer end edge of the gripping jaw 70 in one embodiment of the device, with the other free edge 78 being free of gripping teeth in the FIG. 5 embodiment; however, other embodiments do not have gripping teeth at all, and gripping teeth can be included on free edge 78 as well if desired.

The prongs 60 and 62 are flexible and are spaced apart to define a dial push-button receiving gap 80 between the prong heels 82 and 84 of the prongs 60 and 62, respectively. The gripping jaws 70 and 72 extend outwardly from the escutcheon a distance determined according to considerations which will be evident from the ensuing disclosure.

The key barrel 38 of the locking means 34 has retractable keys 90 which are mounted on the barrel to be extended and operated by a key. These keys are received in keyways 54 of the escutcheon and are extended outwardly of the barrel to lock that barrel in the escutcheon in a manner which prevents rotation of the barrel about the longitudinal centerline thereof with respect to the shield. A top rim 92 circumferentially surrounds the barrel at one end thereof and defines a ledge 94 which rests on the ledge 58 of the escutcheon. The barrel is supported against longitudinal axial movement by the ledges 58 and 94.

The keys 90 are retracted by a mechanical linkage and mechanism located within the barrel and operated by a key mechanism coupled to and controlled by a key inserted into the key slot KS. The key mechanism is usual to locks wherein tumblers are operated by properly positioned key teeth, and will not be further discussed.

The barrel has a lower end 98 having a cam operating plate 100 mounted thereon. The plate 100 is rectangular and has longitudinal side edges 102 and 104 and end edges 106 and 108. A bore 110 is defined through the plate 100, and screw threads 112 are defined on the plate to project inwardly of the bore 110. The plate can be integral with the barrel if so desired.

The bottom 98 of the barrel is essentially coplanar with the bottom rim 66 of the escutcheon when the barrel is received in the escutcheon. The plate 100 thus extends beyond the plane of the escutcheon rim 66. A cam 120 is mounted on the barrel by a set screw 124 via the plate 100. The cam is a prolate ellipse in circumferential shape, and thus has a circumferential rim 126 having flat portions 128 and 130 on each side of the center of the cam, and oval portions 132 and 134 on the ends of that cam. The rim 126 forms a camming surface as will be discussed below.

A rectangular plate receiving opening 138 is defined in the cam 120 at or near the center thereof and is sized and shaped to snugly receive and engage the plate 100 so that the cam rotates with the key barrel 38 upon rotation of the locking means 34 by an authorized person. The screw 124 has a shank 140 which has screw threads 142 which are cooperable with the screw threads 112 in the plate 100. The screw 124 has a head 146 which has a diameter large enough to seat on the cam lower surface 150 and thereby securely attach the cam to the key barrel. The cam thus extends out of the plane containing the key barrel end 98 and the rim 66.

The cam is positioned between the prongs and has a lengthwise dimension between ends 132 and 134 through the center of the cam in excess of the distance between prong upper ends 154 and 156 of the prongs 60 and 62, respectively. The widthwise dimension of the cam 120 between the sides 128 and 130 through the center of the cam is smaller than the distance between the prong upper ends. Thus, rotation of the key barrel causes the cam to rotate, and when the lengthwise dimension of the cam is essentially perpendicular with the prong transverse dimensions, the prongs are flexed away from each other; and, conversely, when the lengthwise dimension of the cam is not so oriented with respect to the prongs, the prongs assume a relaxed position. Gap 80 is large enough to accommodate the cam 120, but small enough to permit the beforementioned cam induced prong flexing and relaxing operation of the locking means 34.

The locking means 34 will not rotate until the keys 90 are retracted, and thus, the cam cannot be rotated until a proper key is used to release the key barrel. Until the barrel is rotated to release the prong flexing caused by the cam, the cam keeps the prongs spread. Such a configuration is the locked configuration of the locking mechanism, and thus in the locked configuration of the locking and mounting means, the prongs are biased away from each other against the natural resiliency thereof.

Figure 2:
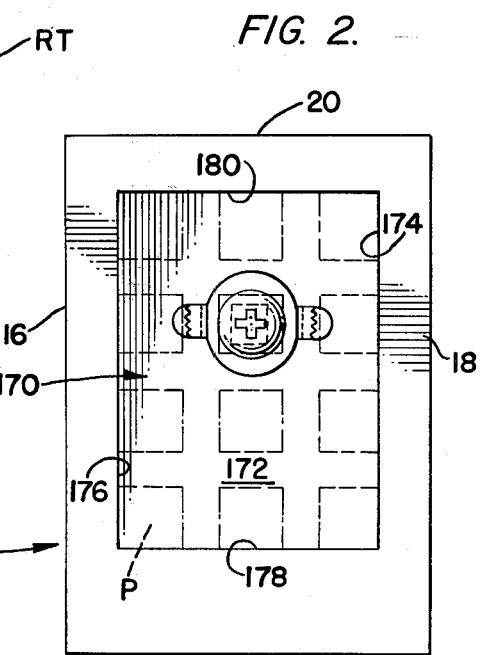
FIG. 2 is a rear view of a locking device embodying the teachings of the present invention in an unlocked configuration.
Figure 3:
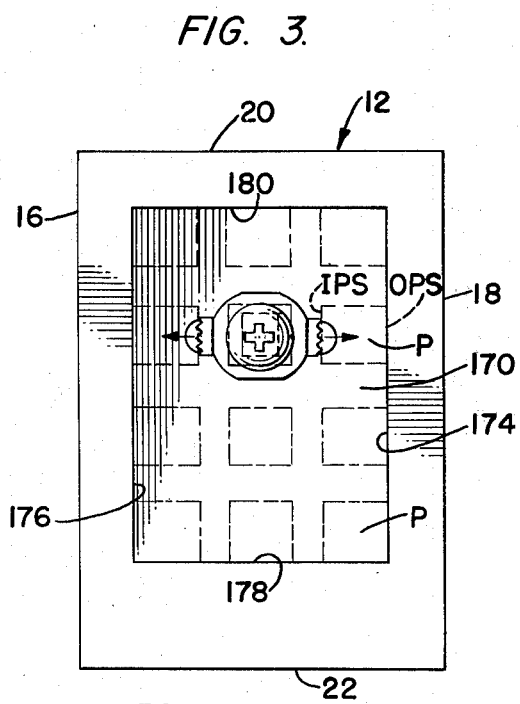
FIG. 3 is a rear view of a locking device embodying the teachings of the present invention in a locked configuration.
Figure 4:
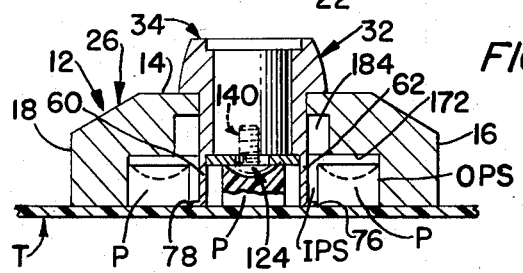
FIG. 4 is a view taken along line 4—4 of FIG. 1.

As shown in FIGS. 2, 3 and 4, the shield 12 has a dial push-button receiving chamber 170 defined therein. The chamber is defined by inner surface 172 of the shield, and by inner surfaces 174, 176, 178 and 180 of the shield sides and ends, respectively. The chamber 170 is shown as being rectangular, and while such a shape is preferred, it is not essential. The chamber need only enclose dial push-buttons P and is so dimensioned. As will be discussed below, the length and width dimensions of the chamber need only be selected so that the outer push-buttons are in contact with the inner surfaces 174, 176, 178 and 180. The dial push-buttons are indicated in FIGS. 2 and 3 by phantom lines. A counterbore 184 is defined in the shield, and an escutcheon receiving bore 186 is aligned with the counterbore for receiving the escutcheon as shown in FIG. 4.

As can be seen in FIGS. 2 and 3, when the cam 120 is rotated to have the lengthwise dimension thereof essentially perpendicular to the prong transverse dimensions, as in FIG. 3, the prongs are forced outwardly into the locking configuration. The prong movement induced by the cam is sufficient to jam the gripping jaws 76 and 78 against inner sides IPS of the push-buttons, as shown in FIG. 4. The size of the chamber 170 is selected so that the outer sides OPS of the outer push-buttons are flush with the inner surfaces 174, 176, 178 and 180. By jamming the gripping jaws against the push-button inner sides, the jammed push-buttons are wedged against the chamber walls. The size of the elements of the device 10 are selected so that this wedging action is secure enough to prevent withdrawing the shield from the telephone once the cam is rotated into the FIG. 3 locked position. The keys of the key barrel are locked into the keyways, and the operating key removed to lock the dial of the telephone T.

For authorized use of the telephone, the key is inserted into the keyslot KS, and the key barrel rotated with respect to the escutcheon, which is securely mounted in the shield, to rotate cam 120 into the FIG. 2 position wherein the lengthwise dimension thereof is no longer essentially perpendicular to the transverse dimension of the prongs. The prongs thus released will relax thereby withdrawing the gripping jaws from the push-button sides IPS. Withdrawal of the gripping jaws from sides IPS releases the push-button from the wedging engagement thereof against the chamber wall, thereby releasing the shield from the telephone to permit access to the dial push-buttons.

As shown in FIGS. 1-4, the gripping jaws grip the dial push-buttons corresponding to the dial digits four and six, and gap 80 accommodates the push-button corresponding to the dial digit five. Other combinations can be used without departing from the scope of the present disclosure.

Figure 6:
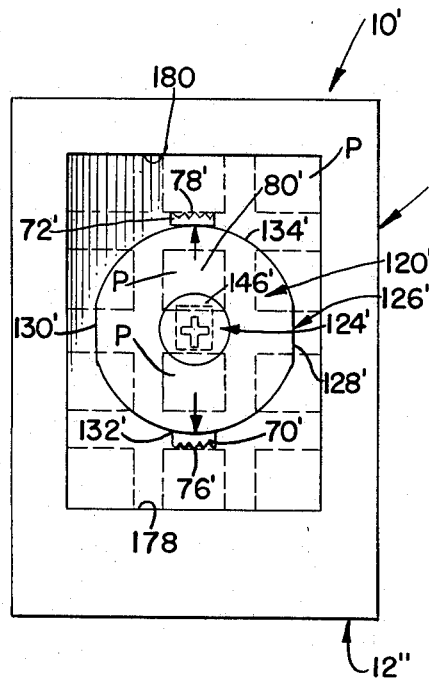
FIG. 6 is a rear view of an alternative form of the dial push-button telephone locking device embodying the teachings of the present invention.

An alternative embodiment of the telephone locking device is shown in FIG. 6, and is indicated by reference numeral 10'. The locking device 10' is similar to the device 10, and thus will not be described in detail. The device 10' includes a cam and a gap 80' sized to straddle two push-buttons, and the gripping jaws 76' and 78' contact sides IPS of the push-buttons corresponding to the dial digits two and zero on the dial to wedge those two push-buttons against chamber inner surfaces 180 and 178, respectively. The cam and locking and holding means are all sized correspondingly larger in device 10' in relation to device 10 to facilitate such orientation. As shown in FIG. 6, the gripping jaws of the device 10' move toward and away from shield ends 20 and 22 as opposed to the shield sides 16 and 18 in the device 10.

Another alternative embodiment of the telephone locking device is shown in FIGS. 7-11, and attention is directed thereto. The device is indicated by the reference numeral 10″, and operates on a principle similar to the just-discussed devices 10 and 10′, that is, a dial push-button is gripped to prevent removal of the dial protecting shield from the telephone.

Figure 7:
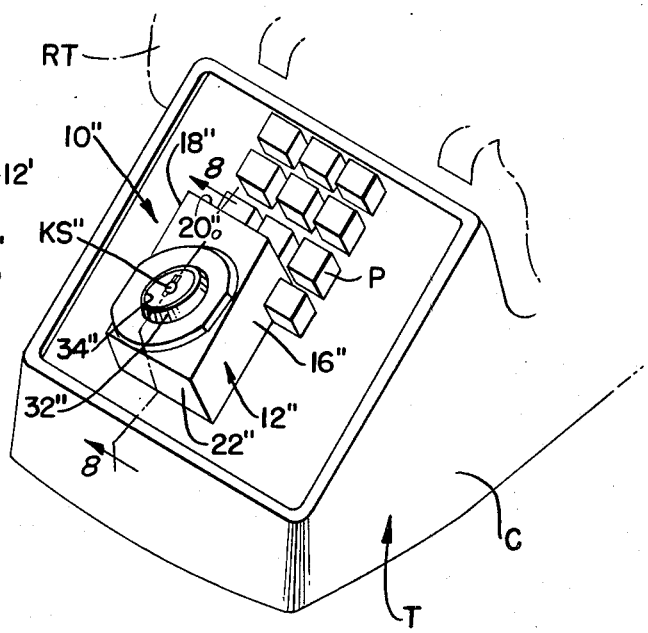
FIG. 7 is a perspective view of a dial push-button telephone having thereon another embodiment of a locking device embodying the teachings of the present invention.

In the locking device 10″, one single push-button, or several push-buttons (however, less than the total number of buttons in the telephone dial array) are covered without covering the entire dial. These push-buttons are indicated in FIG. 7 as corresponding to the zero, seven and eight digits, and in FIG. 9, the five, six, eight and nine buttons. The nine button can also be covered individually if so desired to prevent unauthorized outside calls from a business having an internal telephone system. Other single digits can be locked as well to prevent use of special long distance facilities, or the like.

The device 10″ is rectangular and includes a shield 12″ having a front surface 14″, sides 16″ and 18″ and ends 20″ and 22″.

The shield has a mounting means 30″ which includes a tubular escutcheon 32″ securely mounted in the shield and surrounding a locking means 34″ which has a key barrel 38″ telescopingly and rotatably received in the escutcheon. An operating key slot KS″ is defined in the top surface of the key barrel to be presented outwardly of the shield. The mounting means 30″ is located near one end of the shield as shown in FIG. 7.

Figure 8:
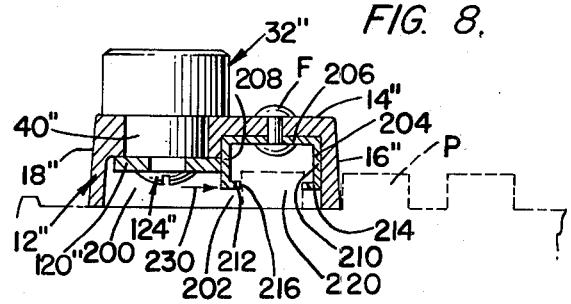
FIG. 8 is a view taken along line 8—8 of FIG. 7.
Figure 11:
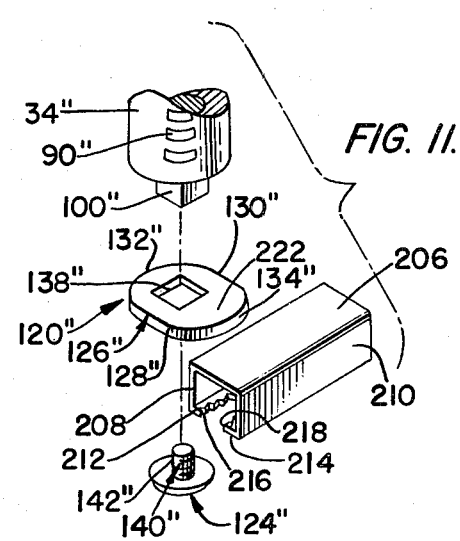
FIG. 11 is an exploded perspective of a portion of the FIG. 7 telephone locking device.

The shield mounting and locking means are similar to those included in the device 10, and are best shown in FIGS. 8 and 11. The escutcheon includes a tubular body section 40″ and a head section 42″ which are both tubular and which have different outer diameters to define a ledge 44″ at the junction thereof.

The key barrel 38″ has keys 90″ which are retractably held thereon to fit into keyways 54″ defined in the escutcheon tubular portion 40″. The keys are operated by a key and lock mechanism as in the FIG. 1 embodiment. A projection 100″ is integrally mounted on the bottom end 98″ of the key barrel to extend out of the plane containing that barrel end, and thus out of the plane containing lower rim 66″ of the escutcheon tubular portion which is essentially coplanar with the barrel lower end.

A cam 120″ is held on the key barrel end 98″ by a screw 124″ threadably cooperating with internally threaded bore 110″ defined through the projection 100″. The cam is oval in peripheral shape so that camming surface 126″ thereof has a pair of flat sides 128″ and 130″ and a pair of arcuate ends 132″ and 134″. A rectangular hole 138″ is defined in the cam to snugly receive the plate 100″ to attach the cam 120″ to the key barrel 38″ for rotation therewith.

Figure 9:
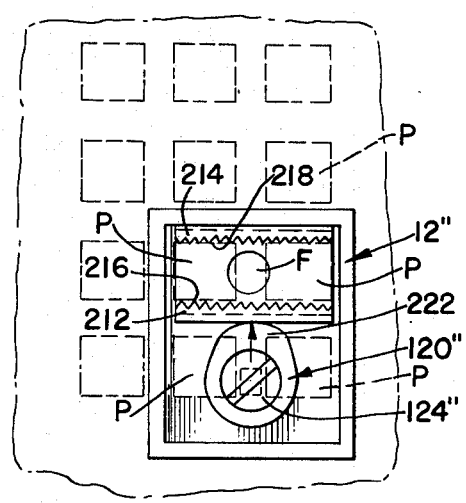
FIG. 9 is a rear view of the FIG. 7 telephone locking device in the dial push-button locking configuration.
Figure 10:
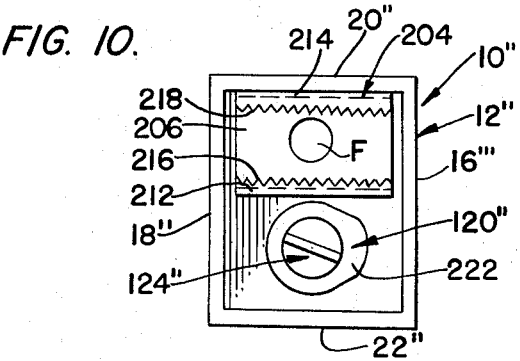
FIG. 10 is a view of the FIG. 7 dial push-button telephone locking device in the unlocked configuration.

As best shown in FIGS. 8, 9 and 10, the cam 120″ is received in a cam chamber 200 located adjacent one end of the shield. The chamber 200 is circular and has a diameter larger than the lengthwise dimension of the cam from end 132″ through the center of the cam to end 134″ to permit movement of the cam.

A dial button gripping means chamber 202 is defined in the shield adjacent the cam chamber. The ends and sides of the shield and the underside of the top surface of the shield define the two chambers. The chamber 202 is rectangular in shape with the long dimension thereof oriented transversely of the shield.

A push-button gripping means 204 is mounted in chamber 202 by a fastener F, and is U-shaped in transverse cross-section. The gripping means 204 includes a web 206 affixed to the underside of the shield top surface and a pair of downwardly depending legs 208 and 210 which are integrally attached to the web to be in spaced parallelism with each other. Each leg has an inturned foot 212 and 214 on the lower end thereof with the feet 212 and 214 extending toward each other.

The inner ends 216 and 218 of the feet 212 and 214, respectively, can have knurling thereon, or gripping teeth or the like as was discussed above with regard to the device 10.

The legs 208 and 210 have a gap 220 defined therebetween and the inner edges of the feet which gap is sized to fit freely over a dial push-button. As shown in FIG. 11, the projection receiving hole 138″ is defined off-center in the cam so that the cam has a large end 222. The end 222 is disposed adjacent the leg 208, and abuts that leg when the key barrel is rotated to orient the lengthwise dimension of the cam at an angle with, and in one embodiment, perpendicular with, the lengthwise dimension of the leg 208. The cam thus forces the leg 208 towards the leg 210 against the natural resilience of that leg as indicated by the arrow 230 in FIG. 8.

As shown in FIGS. 8–10, rotation of the key barrel rotates the cam 120″ to jam the gripping means foot 212 against one side of the dial push-button P and force the other side of the push-button against the other foot 214 to thereby wedge the button between the feet and thereby capture the button. The shield 12′ is thus locked onto the dial push-button.

To free the shield 12′, a key is inserted into the keyslot KS″ by an authorized person, and the cam 120″ is rotated out of abutting contact with the gripping means leg to free the push-button. Locking is, of course, the reverse procedure.

The locked configuration of the device 10″ is shown in FIG. 9, and the unlocked configuration thereof is shown in FIG. 10.

Figure 12:
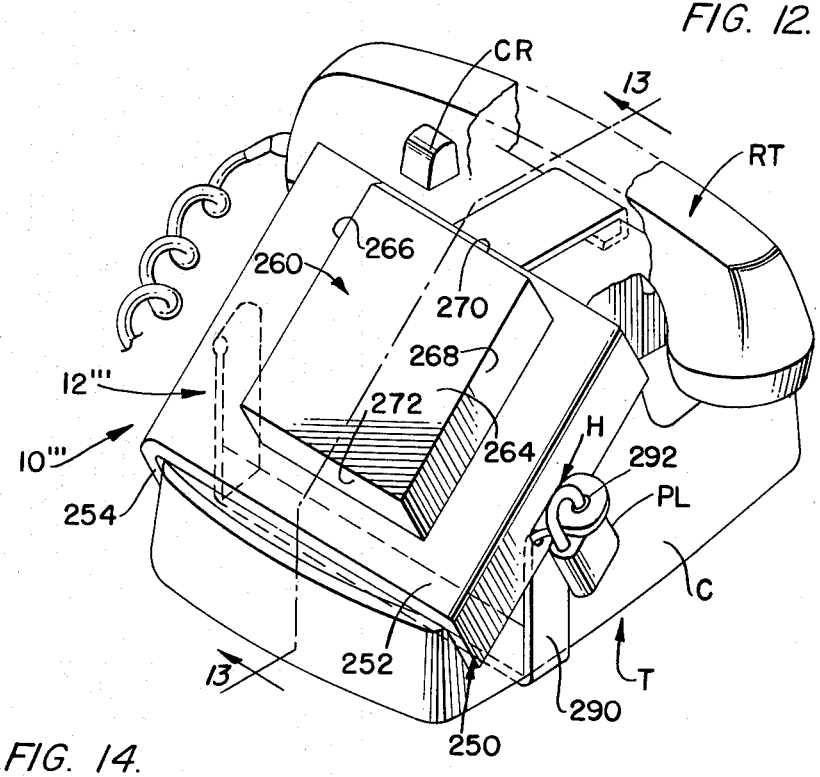
FIG. 12 is a perspective of a dial push-button telephone having thereon yet another embodiment of a dial push-button telephone locking device embodying the teachings of the present invention.
Figure 14:
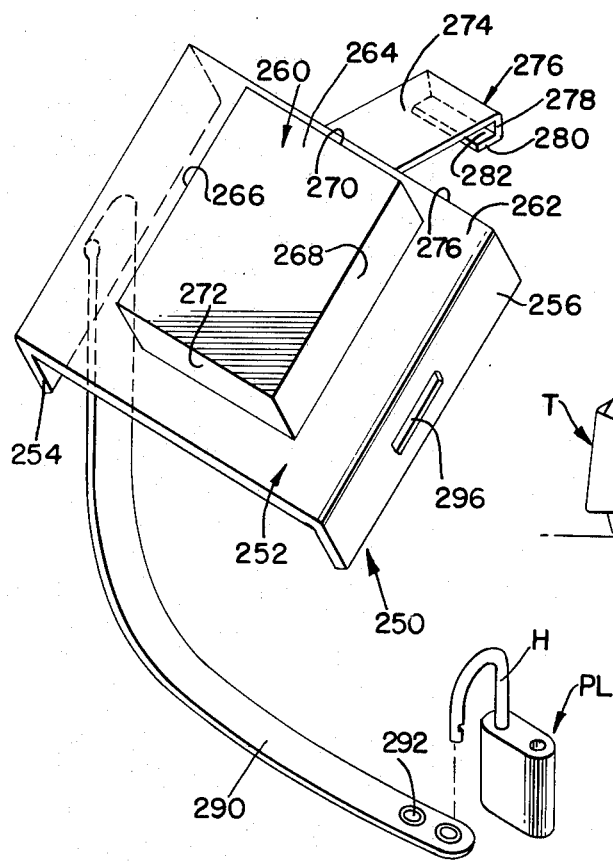
FIG. 14 is an exploded perspective of the telephone locking device shown in FIG. 12.
Figure 13:
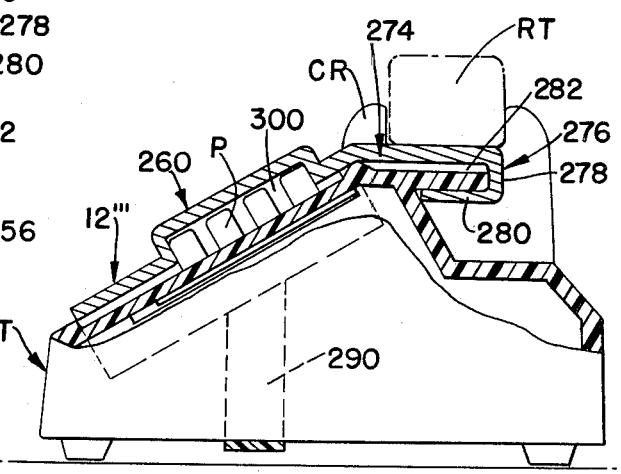
FIG. 13 is a view taken along line 13—13 of FIG. 12.

Yet another embodiment of the locking device is shown in FIGS. 12–14, and is indicated by reference numeral 10‴.

The locking device 10‴ includes a shield 250 which is best shown in FIG. 14. The shield 250 includes an integral, unitary U-shaped base having a web 252 and a pair of legs 254 and 256 which are connected to the web to be in spaced parallelism with each other. A rectangular boss 260 is integrally mounted on top face 262 of the web and includes a top surface 264, sides 266 and 268 and ends 270 and 272. An attaching flange 274 is integrally attached to shield end 276 to extend at an angle with respect to the web top face 262. The flange 274 has a hook 276 on the end thereof which is remote from the web 252. The hook is J-shaped and includes a bight portion 278 and a short leg 280 spaced from the flange 274. A gap 282 is defined between the flange and the short leg, and, as will be explained below, the hook 276 grasps the telephone case adjacent the crade CR for holding the shield securely in place on a telephone.

A strap 290 is attached at one end thereof to leg 254 and has eyes 292 defined in the other end thereof. A strap receiving slot 296 is defined in leg 256 to receive the strap 290 as indicated in FIG. 12. A suitable lock PL has the shackle or hasp H thereof received in one of the eyes 292 to prevent withdrawal of the strap through the slot from the FIG. 12 configuration.

As shown in FIG. 13, the boss 260 has a chamber 300 defined therein for receiving and accommodating push-buttons P of a telephone dial. As shown in FIGS. 12 and 13, the web 252 fits snugly against the upper surface of a telephone, and the hook 276 is attached to the telephone cradle when the locking device 10''' is in place. To free the dial push-buttons, the lock PL is opened by an authorized person, the hasp H removed from the eye 292, and the strap removed from the slot 296. The shield can then be removed from the telephone, and the telephone used in the usual manner. Locking is, of course, the reverse of the just-described process.

The device 10''' can be used to cover one or several dial push-buttons as in the other embodiments. In such a configuration, the shield and boss are sized accordingly, and the flange 274 sized and extended and bent accordingly to lock the shield over the selected button or buttons. With such a shield, for example, the nine button can be covered, or the six, seven, eight and nine buttons, or the zero button, or the seven, eight and zero buttons can be covered. The strap in the single button embodiment is similar to strap 290 as is the remainder of the shield, only proportionately smaller.

Figure 15:
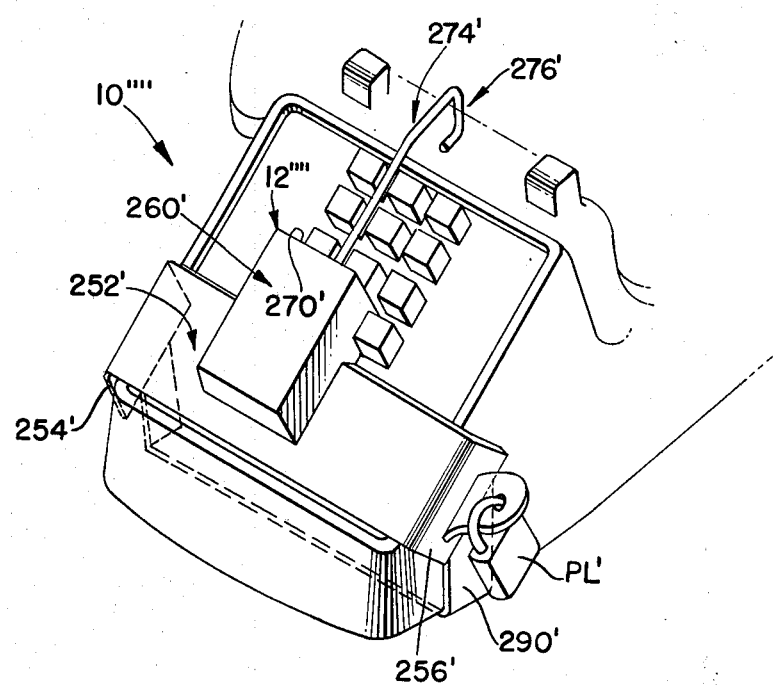
FIG. 15 is a perspective of a dial push-button telephone having thereon another embodiment of the FIG. 12 telephone locking device wherein only some of the total number of buttons in a telephone dial array are disabled by a locking device embodying the teachings of the present invention.

An example of the just-discussed device is shown in FIG. 15. As shown in FIG. 15 the locking device includes a shield 12'''' having a boss 260' mounted on a base which includes a web 252' and a pair of legs 254' and 256'. The boss 260' is sized to securely cover some, but not all, of the push-buttons, and, as shown in FIG. 15, the buttons corresponding to digits seven, eight and zero, or just eight and zero, are enclosed in the boss 260'. A strap 290' and a lock PL' are included to form part of a harness for the device 10''''.

A locking bar 274' corresponds to the flange 274 and extends from end 270' of the boss outwardly therefrom to a bent section which corresponds to the telephone cradle. A hook section 276' is defined on the rod.

It is also noted that the device 10 can be modified to include bars which contact all of the outer buttons. These bars correspond to the prongs 60 and 62 and are located in the columns and rows defined between the central push-buttons having the digits two, five, eight and zero thereon and the outer push-buttons having the digits one, two, three, four, six, seven, nine and zero. These bars include a pair of longitudinally disposed bars and a pair of transversely disposed bars. The bars are connected by a mechanical means to a cam operated by a key barrel. All of the outer push-buttons are thus wedged against the shield chamber to lock the shield onto the dial buttons. Conversely, the bars can clamp the buttons from the outside, with the outer buttons corresponding to digits one, two, three, four, six, seven, nine and zero being unsupported.

It is also noted that the device shown in FIGS. 7-11 can be used to lock the buttons L shown in FIG. 1 to prevent use of certain lines of a multi-line telephone.

All of the telephone locking devices can be manufactured of any suitable materials from stainless steel to plastics. The devices can be opaque or transparent or translucent, or colored as suitable. The strap 290 can be cloth, or steel reinforced cloth, or steel fiber as suitable. Various ornamentation can also be placed on the shields of the locking devices, and the shields can assume various geometric configurations from oval shaped to rectangular, or the like.

As this invention may be embodied in several forms without departing from the spirit or essential characteristics thereof, the present embodiments are, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

What is claimed is:

1. A locking device for preventing unauthorized use of a push-button telephone, comprising:
a protective shield for preventing access to at least one of the dial push-buttons on a dial push-button telephone, said shield including a front surface, a rear surface, sides and ends and having a dial push-button receiving chamber defined in said rear surface for accommodating therein the at least one dial push-button, said chamber being located in said shield rear surface so that access to the interior of said chamber is only possible from said shield rear surface so that said shield prevents access to the at least one dial push-button when said shield is in position on a telephone; and
shield mounting means for detachably mounting said shield on a telephone, said mounting means including locking means for locking said shield on the telephone, said shield mounting means including a dial push-button grasping means attached to said locking means and grasping the at least one dial push-button to hold said shield in a dial push-button covering position on the telephone, said locking means including grasping means operating means mounted on said locking means for moving said grasping means into a dial push-button grasping position to mount said shield on a telephone with the at least one dial push-button accommodated in said dial push-button receiving chamber to control access to the at least one dial push-button.

2. The locking device defined in claim 1 further including a second dial push-button grasping means.

3. The locking defice defined in claim 1 wherein said locking means includes a key lock mounted on said shield so that access to a key slot is from said front surface.

4. The locking device defined in claim 1 wherein all of the dial push-buttons of a dial push-button telephone are accommodated in said chamber.

5. The locking device defined in claim 1 wherein said grasping means includes teeth engaging at least one side of the at least one dial push-button.

6. The locking device defined in claim 1 wherein said dial push-button grasping means includes a prong attached at one end thereof to said locking means and having another end adapted to contact one side of a dial push-button, a cam mounted on said locking means and adapted to abut said prong to move said prong another end toward such push-button one side, and means abutting another side of such push-button against which such push-button is wedged by said prong.

7. The locking device defined in claim 6 wherein said cam has a hole defined therein and said locking means has a plate mounted thereon, said plate being snugly received in said cam hole.

8. The locking device defined in claim 7 wherein said locking means includes an escutcheon and a key barrel rotatably held within said escutcheon, said key barrel having keys retractably mounted thereon and key operating means for extending said keys outwardly of said key barrel, said escutcheon having keyways defined therein for receiving said extended keys to lock said key barrel against rotation.

9. The locking device defined in claim 8 wherein said cam is mounted on said key barrel for rotation therewith.

10. The locking device defined in claim 9 wherein said prong includes a knurled surface thereon for contacting a push-button.

11. The locking device defined in claim 10 further including a second prong attached at one end thereof to said locking means and being spaced from said first prong and having another end thereof adapted to contact one side of another dial push-button, said cam being mounted to abut said second prong to move said second prong another end toward such another push-button one side, and second means abutting another side of the second push-button against which such second push-button is wedged by said second prong.

12. The locking device defined in claim 1 wherein said shield has a grasping means chamber defined therein adjacent said push-button accommodating chamber, and wherein said dial push-button grasping means is located in said grasping means chamber.

13. The locking device defined in claim 12 wherein said grasping means includes a base attached to said shield, a prong attached at one end thereof to said base and having another end adapted to abut said prong to move said prong another end toward such push-button one side, and means abutting another side of such push-button against which such push-button is wedged by said prong.

14. The locking device defined in claim 13 wherein said grasping means further includes a second prong attached at one end thereof to said base and being spaced from said first prong, said second prong having another end adapted to contact another side of the push-button.

15. The locking device defined in claim 6 wherein said prongs are spaced apart a distance sufficient to accommodate one dial push-button of the telephone.

16. The locking device defined in claim 6 wherein said prongs are spaced apart a distance sufficient to accommodate a plurality of dial push-buttons of the telephone.

17. The locking device defined in claim 7 wherein said hole is located off-center in said cam.

* * * * *